United States Patent [19]
Cino et al.

[11] Patent Number: 6,105,980
[45] Date of Patent: Aug. 22, 2000

[54] BOX FOR USE WITH A DOLLY AS A BOX AND DOLLY SYSTEM

[76] Inventors: Nadine Cino; Martin Spindel, both of 501 7th Ave., 18th Fl., New York, N.Y. 10101

[21] Appl. No.: 08/841,044

[22] Filed: Apr. 29, 1997

Related U.S. Application Data

[63] Continuation-in-part of application No. 08/370,420, Jan. 9, 1995, abandoned.

[51] Int. Cl.[7] ...................................................... B62B 3/16
[52] U.S. Cl. .................. 280/33.998; 206/505; 206/509; 220/4.27; 280/79.2
[58] Field of Search .................................. 206/503, 505, 206/509, 511, 512; 220/4.26, 4.27; 248/346.01, 346.5; 280/79.2, 79.5, 33.998, 79.11

[56] References Cited

U.S. PATENT DOCUMENTS

| | | | |
|---|---|---|---|
| D. 299,578 | 1/1989 | Wilson | D34/12 |
| 1,912,847 | 6/1933 | Klepel | 280/33.998 X |
| 5,060,819 | 10/1991 | Apps | 206/503 X |
| 5,184,836 | 2/1993 | Andrews, Jr. et al. | 280/79.2 X |
| 5,375,741 | 12/1994 | Harris | 222/143 X |
| 5,542,635 | 8/1996 | Smith et al. | 280/47.35 X |

FOREIGN PATENT DOCUMENTS

| | | |
|---|---|---|
| 310103 | 12/1955 | Germany . |
| 2156407 | 7/1972 | Germany . |

*Primary Examiner*—Michael Mar
*Attorney, Agent, or Firm*—Eugene Lieberstein; Michael N. Meller

[57] ABSTRACT

A box and a dolly wherein the box comprises a plurality of substantially upright walls with at least one of the walls having at least two surfaces disposed in an offsetting relationship for forming an overhang and wherein the dolly comprises at least one complementary surface for engaging the overhang to support the box along the overhang. The dolly does not have a horizontal platform typical of conventional dollies.

8 Claims, 16 Drawing Sheets

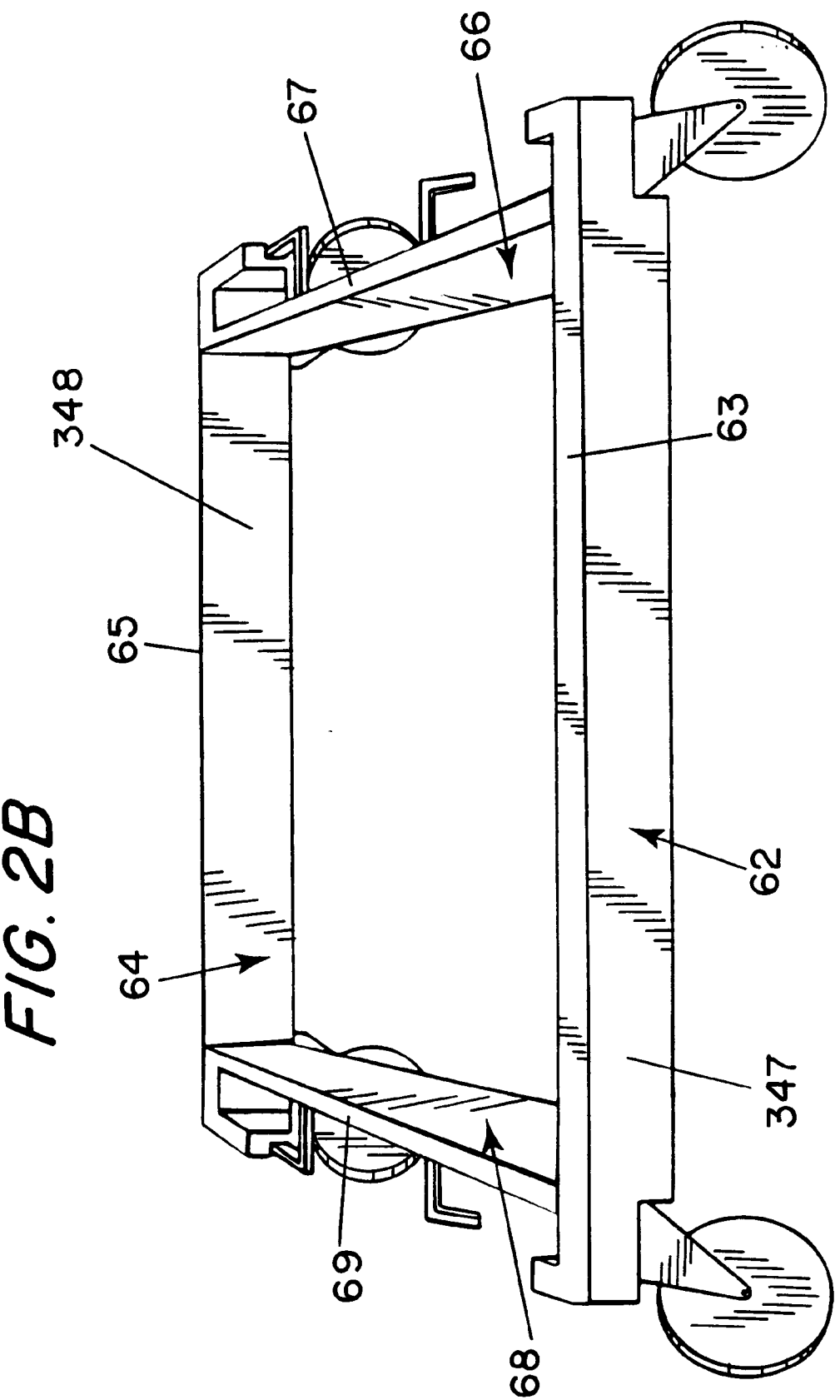

819  820  FIG. 5D

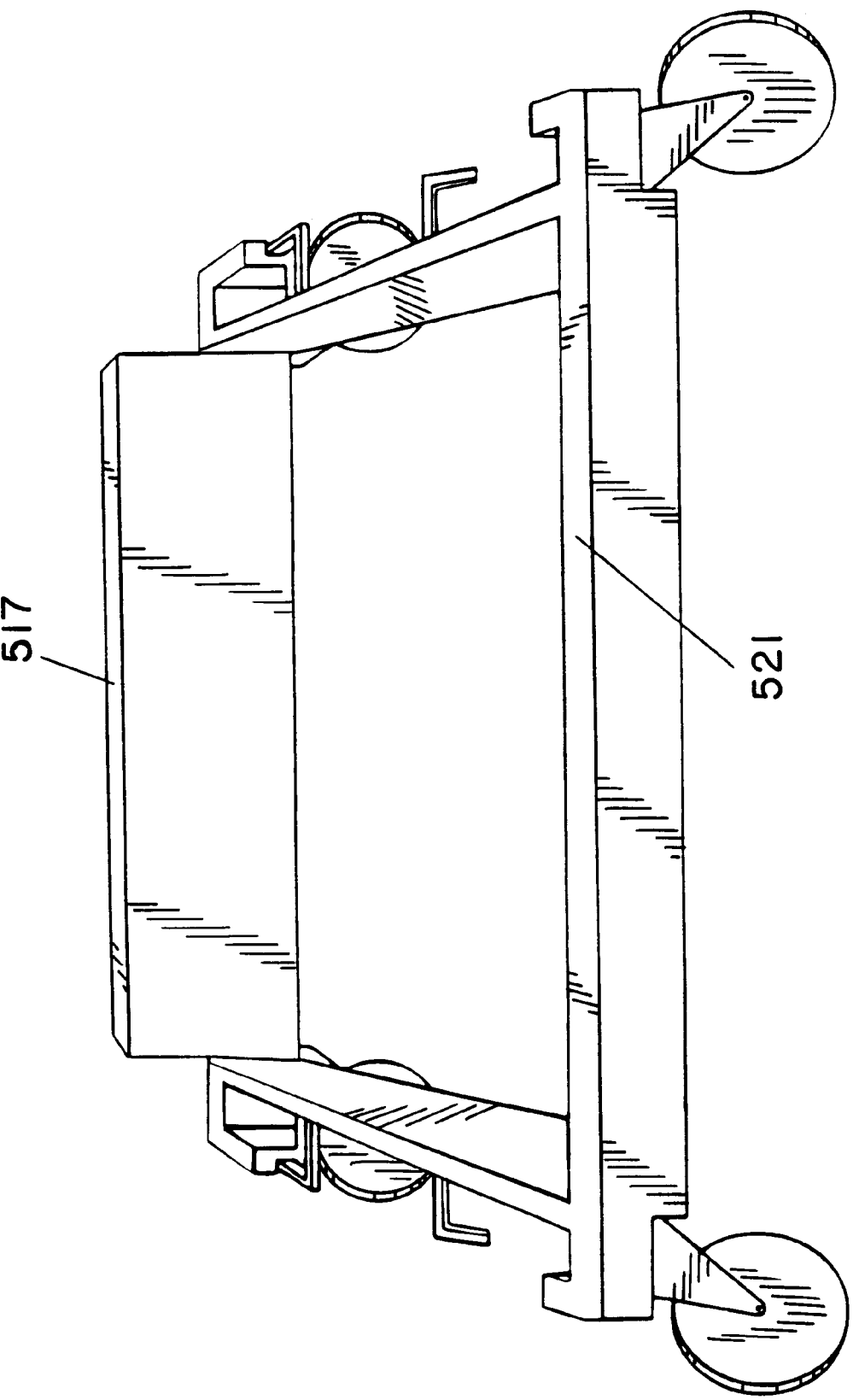

BOX FOR USE WITH A DOLLY AS A BOX AND DOLLY SYSTEM

This patent application is a continuation-in-part of U.S. application Ser. No. 08/370,420, filed Jan. 9, 1995 now abandoned and relates to a box for use with a dolly as a box and dolly system for moving, storing and retrieving file folders and various items and materials commonly used by businesses and individuals.

FIELD OF INVENTION

1. Background—Description of Prior Art

Historically, corrugated cardboard boxes have been used by businesses to hold file folders and other contents when relocating. During the past 5 to 10 years boxes made of plastic have been introduced as an alternative to using cardboard boxes in office moving. To date, boxes used in office moving, whether cardboard or plastic, have been commonly transported aboard dollies.

A dolly is a form of a movable cart that is typically comprised of a horizontal platform resting atop a set of wheels (such typical dolly is referred to hereafter as a "traditional platform dolly"). The utility of this construction is broad. It not only lends itself to moving boxes that vary greatly in shape and size, but to transporting a large variety of other objects such as furniture. In one respect, this broadness of utility creates a disadvantage, as it makes the traditional platform dolly an attractive target of theft.

The box and dolly of the present invention were specifically designed to mate with each other and only each other. The dolly of the present invention does not have a horizontal platform and will not hold any object other than the box of the present invention. Accordingly, the dolly of the present invention is limited in its utility and is much less attractive as a target of theft than the traditional platform dolly.

As such, the dolly of the present invention can be used in certain situations where the traditional platform dolly would be subject to high levels of theft. One example of this occurs in office moving, where it would be desirable to have dollies on hand during the process of packing boxes. As that situation often necessitates leaving dollies unattended for long periods of time, the traditional platform dolly is not a practical vehicle as it would likely be stolen in large quantities. The dolly of the present invention offers a better alternative as it is less likely to be stolen.

Since, as a practical matter, the dolly of the present invention can be on hand during packing, empty boxes can be placed on it and then packed while they are aboard the dolly. Since such empty boxes are relatively light in weight, they are easy to lift when placing them on the dolly.

This contrasts with the traditional platform dolly, which is typically brought to the moving location after the boxes have been packed. Since such packed boxes are relatively heavy, they are difficult to lift and load onto the dolly.

As a result, the dolly of the present invention offers two distinct advantages over the traditional platform dolly. Firstly, it is easier to load boxes onto the dolly of the present invention, since such boxes are typically empty and light in weight at the time they are being loaded. Secondly, and most importantly, since such empty ligthtweight boxes are easy to lift, they can be stacked to a higher level than is practically attainable with the traditional platform dolly (which is typically loaded with filled, heavy boxes that are difficult to lift).

This means that, as a practical matter, more boxes can be stacked on the dolly of the present invention than on the traditional platform dolly. When there are more boxes per stack, there are fewer stacks to be moved. As a result, the move goes faster.

For example, the dolly of the present invention might typically be loaded with five boxes, whereas a traditional platform dolly might typically be loaded with only three boxes (because it is too difficult to lift heavy boxes above three high when loading them onto the traditional platform dolly). If there were 1,500 boxes to be moved, with the dolly of the present invention there would be 300 stacks with each stack being five high aboard the dolly (300×5=1,500). With the traditional platform dolly, there would be 500 stacks with each stack being three high aboard the dolly (500×3=1,500). So with the dolly of the present invention, there would be 300 stacks to be moved, whereas with the traditional platform dolly there would be 500 stacks to be moved. Accordingly, with the dolly of the present invention there would be 200 fewer stacks to be moved, thereby saving moving time and cost.

Furthermore, stacks of boxes are often left on their dollies while they are being transported aboard a moving truck. With the dolly of the present invention, the boxes would be stacked five high inside the truck. With the traditional platform dolly, boxes would only be stacked three high inside the truck. Accordingly, with the dolly of the present invention trucking space can be utilized more efficiently. All of these savings derive from the relatively low theft appeal of the dolly of the present invention, which is based upon its design as an item of limited utility.

When typical platform dollies are delivered to a location for use in moving they are usually cross-stacked (illustrated in FIG. 7C), meaning that any two adjacent dollies in a stack are in different orientations from each other. Such stacks are difficult to maneuver, lack stability and present a sloppy appearance.

The dolly of the present invention is designed to be parallel stacked (illustrated in FIGS. 7A and 7B), so that all dollies in a stack are in the same orientation. Such stacks are relatively easy to maneuver, stable and neat.

NESTING AND NON-NESTING BOXES

In one embodiment of the boxes of the present invention, such boxes can be nested inside each other (illustrated in FIG. 8A) such that an upper box can sit inside a lower box (referred to as "nesting boxes"). This is accomplished by the side and end walls of the box being oblique or outwardly sloped, such that the top of the box is longer and wider than its bottom. Such side and end walls are non-perpendicular to the bottom of the box, i.e., each of such side and end walls forms an angle of greater than ninety (90) degrees with the bottom of the box. A set of nesting posts (shown as element 75 in FIG. 8A and, an enlarged view of which is shown in FIG. 8B) functions to halt the descent of the top box into the interior of the bottom box, thereby preventing the top box from descending so far that the fit becomes tight and the two boxes become difficult to separate. The nesting feature saves space when the boxes are not in use.

In another embodiment, the boxes of the present invention do not nest inside each other (referred to as "non-nesting boxes"). In that case, the side and end walls of the box are not oblique or outwardly sloped, but are perpendicular to the bottom of the box, i.e., each of such side and end walls forms an angle of ninety (90) degrees with the bottom of the box (illustrated in perspective in FIG. 1E, and a cross sectional view which is shown in FIG. 1F). When the boxes are empty they can be stacked one above another, but they cannot be nested inside each other. When non-nesting boxes are not in use they require more space to store than nesting boxes.

BRIEF DESCRIPTION OF THE DRAWINGS

Other advantages of the present invention will become apparent from the following detailed description of the invention when read in conjunction with the following drawings of which:

FIG. 2B is a perspective view of a second embodiment of the dolly of the present invention with side and end walls that support the box of FIG. 1C in accordance with the present invention;

FIGS. 5A, 5B, 5C, 5D and 5E are identical to FIG. 1A except that they show variations of the overhang;

FIG. 5F illustrates the dolly that would mate with a box that has an overhang on each of its two opposed side walls, wherein each of said overhangs lies parallel to the floor of the box but are at different heights with respect to each other;

DESCRIPTION OF THE PREFERRED EMBODIMENT OF THE BOX

Figure 1A:
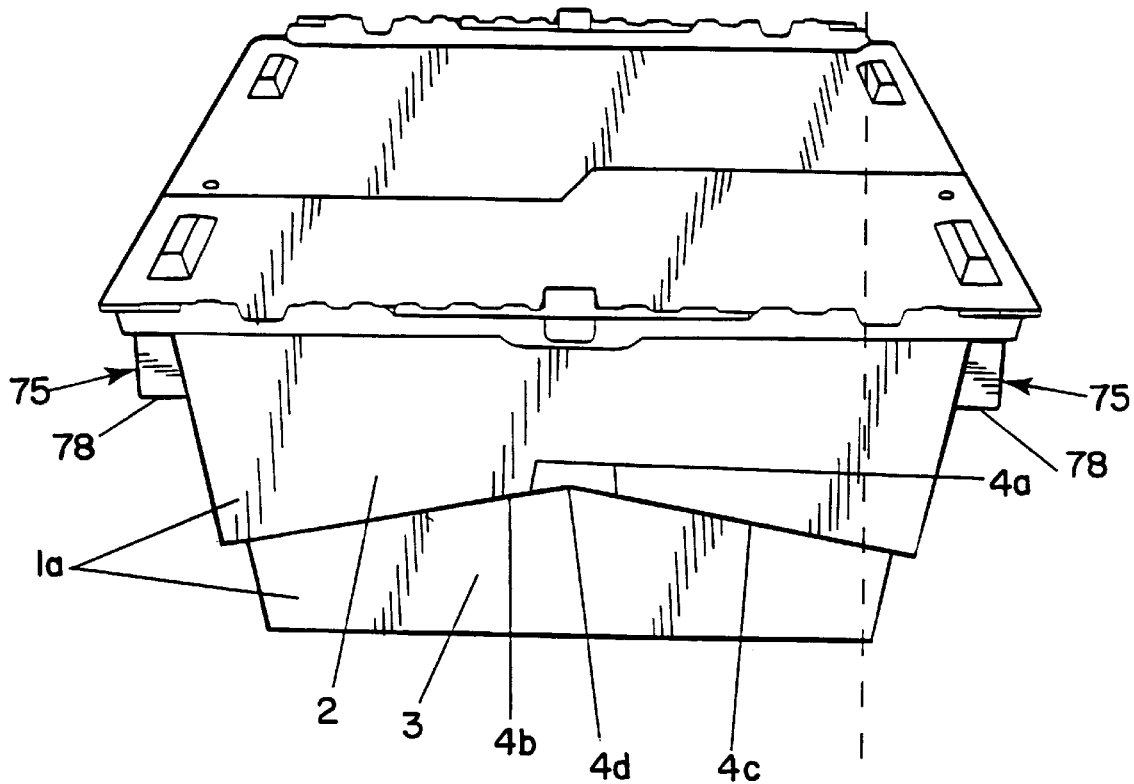
FIG. 1A is a perspective view of the preferred embodiment of the box of the present invention (lids closed), the composition of which includes side walls (shown in FIG. 1A) and end walls (shown in FIGS. 4A and 8A), said side and end walls being oblique walls (i.e., outwardly sloped walls) such that the top of the box is longer and wider than its bottom, and said side and end walls having an overhang which is nonparallel to the floor or bottom wall of the box, which overhang functions to support the box on (the preferred embodiment of) the dolly of the present invention.
Figure 4A:
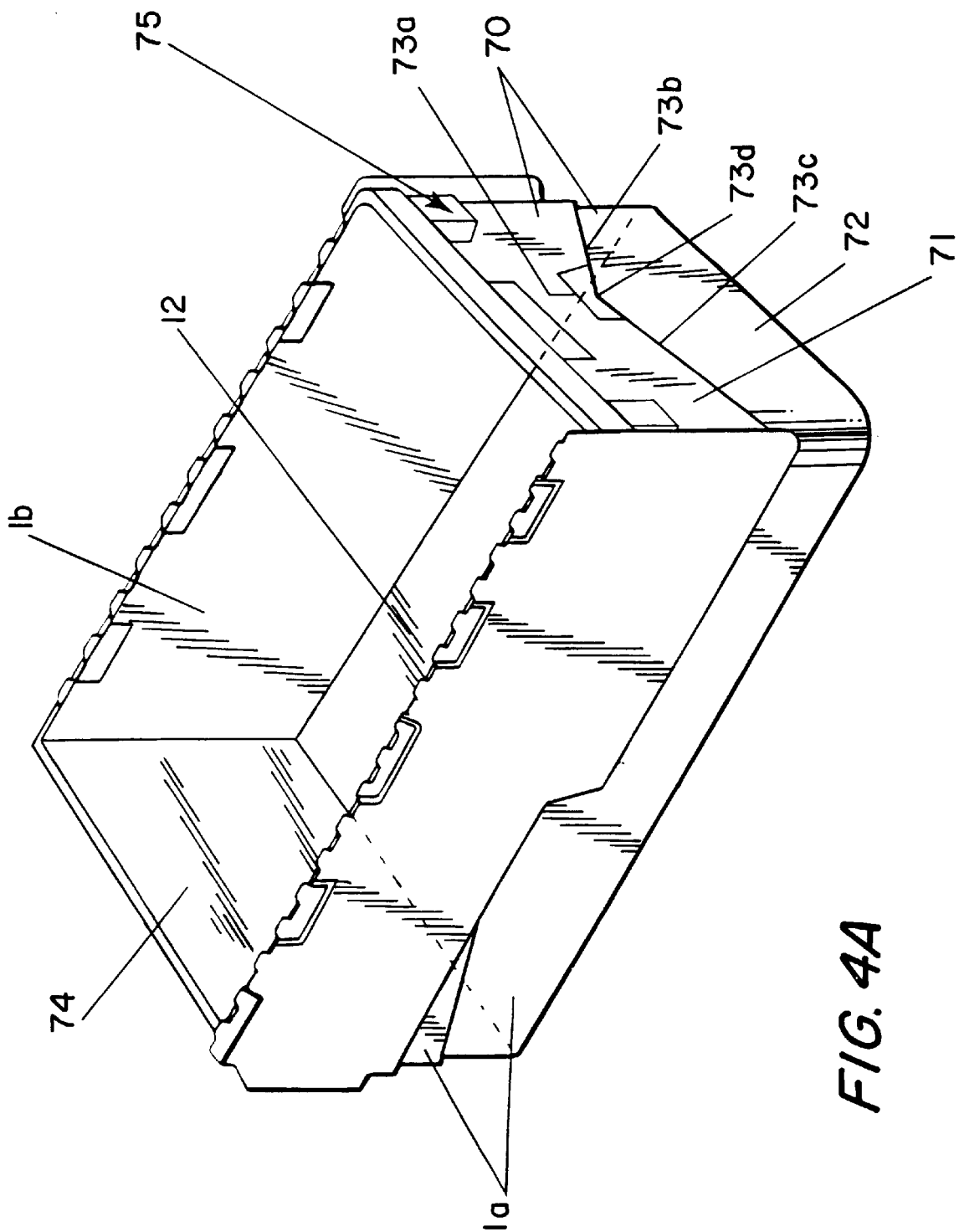
FIG. 4A shows the box of FIG. 1A oriented to show both the side and end walls of the box and with the lids of the box shown open.

FIG. 1A shows a preferred embodiment of the box of the present invention in perspective (top/front view). The box is of substantially rectangular geometry having an opposed pair of side walls and an opposed pair of end walls. The opposed pair of side walls is comprised of wall 1*a* (FIG. 1A) and wall 1*b* (the interior side of which is shown in FIG. 4A). The opposed pair of end walls is comprised of wall 70 (FIG. 4A) and wall 74 (the interior side of which is shown in FIG. 4A).

Figure 1B:
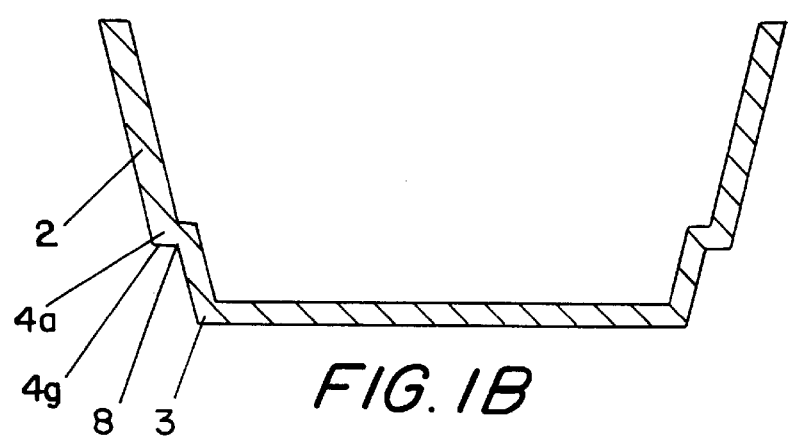
FIG. 1B is a cross sectional view taken along the lines 1B—1B of FIG. 1A.

FIG. 4A shows element 12, which is a common floor or bottom wall of the box. In FIGS. 1A and 4A, the side and end walls are substantially vertical in orientation but are somewhat oblique or sloped, i.e., they extend upwardly and outwardly from common floor 12, such that the box is longer and wider at its top than its bottom, so that the boxes can nest inside each other when empty. As shown in FIG. 1E, in other embodiments of the box, the side and end walls may be perpendicular to the bottom of the box (i.e., they may be nonoblique side and end walls), such that the boxes do not nest inside each other when empty. In FIG. 1E, side wall 1*d* is perpendicular to floor of the box (such floor is not shown). A cross sectional view of such perpendicular walls (taken along line 1F—1F of FIG. 1E) is shown in FIG. 1F.

Side wall 1*a* of FIG. 1A is comprised of upper member 2 and lower member 3, upper member 2 being above and exterior to lower member 3. The relative location of upper member 2 can be variously described as being: (i) to the outside of lower member 3, (ii) in a different plane than lower member 3, the orientation of both planes being substantially vertical or (iii) offset from lower member 3 such that upper member 2 lies above and extends from lower member 3. Upper member 2 and lower member 3 meet along a juncture or common edge (i.e, juncture 8 of FIG. 1B) to form overhang 4*a* (FIGS. 1A and 1B), which is comprised of legs 4*b* and 4*c* (FIG. 1A) which extend along the wall of the box. Said overhang may be variously referred to as a "ledge", "edge", "shelf", or "lip". The structure of overhang 4*a* includes surface 4*g* (shown in cross sectional view in FIG. 1B), which is a downwardly facing surface at the bottom of said overhang. Surface 4*g* is of sufficient length and width to be engaged and supported by the complementary upwardly facing surface 47*a* (FIG. 2A) of the dolly.

Leg 4*b* (FIG. 1A) begins at the left side of side wall 1*a* and rises at a gradual incline half way across the wall until it is joined at its right endpoint by leg 4*c*, which falls at a gradual decline until it reaches the right side of the wall. Legs 4*b* and 4*c* meet on the vertical axis of side wall 1*a* at apex 4*d* in the embodiment shown, but may intersect in a different location or may not intersect at all in other embodiments. Side wall 1*a* and the wall opposite it (the exterior side of which is not shown), comprise the two long walls of the box. The structure and dimensions of side wall 1b (the interior side of which is shown in FIG. 4A) are identical to those of wall 1a.

FIG. 4A shows end wall 70 of the box, which lies adjacent to side wall 1a. End wall 70 is comprised of upper member 71 and lower member 72, upper member 71 being above and exterior to lower member 72 (the location of upper member 71 can be variously described in the same ways as are listed above for members 2 and 3 of FIG. 1A). Said members meet along a juncture or common edge to form overhang 73a, which is comprised of legs 73b and 73c which extend along the wall of the box. The structure of overhang 73a includes a downwardly facing surface (not shown) at the bottom of said overhang, which is conceptually the same as surface 4g of FIG. 1B. Such downwardly facing surface is of sufficient length and width to be engaged and supported by the complementary upwardly facing surface 51a (FIG. 2A) of the dolly.

In FIG. 4A, leg 73c begins at the left side of end wall 70 and rises at a gradual incline half way across the wall until it is joined at its right endpoint by leg 73b, which falls at a gradual decline until it reaches the right side of the wall. Legs 73b and 73c meet on the vertical axis of wall 70 at apex 73d in the embodiment shown, but may intersect in a different location or may not intersect at all in other embodiments. End wall 70 and the wall opposite it (the interior side of which is shown as wall 74), comprise the two short walls of the box. The structure and dimensions of end wall 74 are identical to those of wall 70.

The shape of overhang 73a (FIG. 4A) is same as the shape of overhang 4a (FIG. 1A), but the dimensions are different. Legs 4b and 4c of FIG. 1A are longer than legs 73b and 73c of FIG. 4A. In the illustration shown, Apex 4d of FIG. 1A is higher than apex 73d of FIG. 4A, although in other embodiments of our invention all of such apexes may be of equal height.

The bottom or floor 12 of the box (FIG. 4A) is a planar or flat surface in the embodiment shown, but may be somewhat nonplanar in other embodiments or, otherwise stated, in such embodiments the floor of the box may not be perfectly flat. To account for such variations, when an element of the present invention is defined in relationship to the floor of the box, the language below sometimes refers to "the plane in which the floor of the box substantially lies."

Overhang 4a (FIG. 1A) is nonparallel to common floor 12 (or if such floor is not flat in other variations, then such overhang would be nonparallel to the plane in which said common floor substantially lies). Accordingly, surface 4g (FIG. 1B), which is the downwardly facing surface that comprises the bottom of overhang 4a, is also nonparallel to floor 12. Similarly, overhang 73a (FIG. 4A) is nonparallel to floor 12, as would be its downwardly facing bottom surface (not shown). Otherwise stated, each of such downwardly facing bottom surfaces: (i) comprises or includes a locus of points that is nonparallel to the plane in which the floor of the box substantially lies or (ii) has at least one linear segment that comprises or includes a locus of points that that lie nonparallel to the common floor of said box if said common floor is flat or, if not flat, nonparallel to the plane in which said common floor substantially lies or (iii) rises at an incline along a wall of the box or (iv) forms a slope along a wall of the box or (v) comprises or includes a plurality of points that are at an unequal height with respect to each other or (vi) forms an angle in relation to the floor of the box, which angle is neither ninety (90) degrees nor one-hundred-eighty (180) degrees.

Preferably, at least two of the four walls of the box have an overhang with a downwardly facing surface at its bottom that is designed to be supported by a corresponding complementary upwardly facing top surface of a dolly wall. However, in other embodiments only one of the walls of the box may have such an overhang. In that case, the box would presumably have additional support from the dolly, such additional support being upon a surface other than an overhang. The configuration illustrated by FIGS. 1A and 1B is described in claim 3 and may also be described in other claims.

Figure 8A:
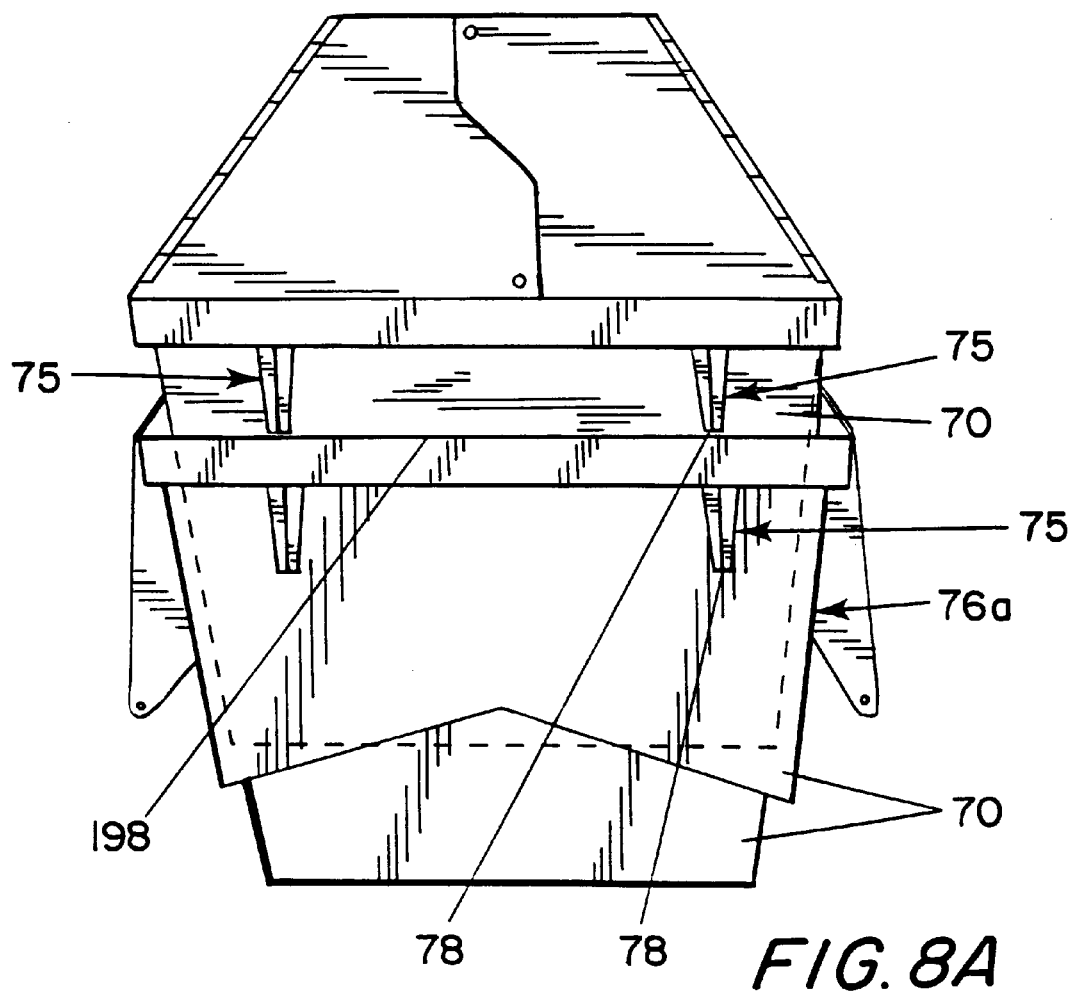
FIG. 8A shows two boxes of the present invention nesting inside each other and FIG. 8B shows an enlarged view of a nesting post which halts the descent of the top box into the interior of the bottom box, thereby preventing the top box from descending so far that the fit becomes tight and the two boxes become difficult to separate.
Figure 8B:
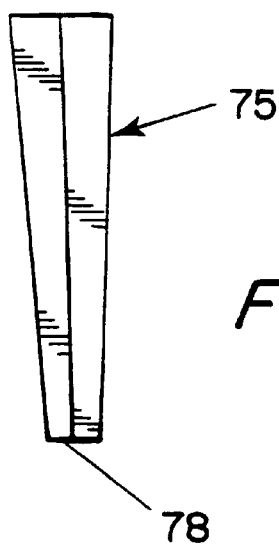

FIG. 8A shows two boxes of the preferred embodiment nesting inside each other, such that the upper box is sitting inside the lower box. End wall 70 and side wall 1a (shown in FIG. 1A) are vertically oriented oblique wall that extends upwardly and outwardly from the common floor or bottom wall of the box, such that the box is longer and wider at its top than its bottom. Nesting post 75 is a projection that extends from end wall 70 and functions to limit the amount by which the the upper box can descend into the interior of the lower box. Surface 78 (an enlarged view of which is shown in FIG. 8B), which is the bottom surface on the nesting post, is downwardly facing and abuts surface 198 on the lower box (which is of identical construction to the upper box), which is an upwardly facing surface of said lower box. The opposite wall of the box (not shown) contains a nesting post arrangement that is identical to the one shown on end wall 70.

It should be noted that all points on surface 4g (FIG. 1B), which surface comprises the downwardly facing bottom surface of overhang 4a (FIG. 1A), are at a height, level or location which is below the height, level or location of surface 78, said surface 78 being the downwardly facing surface that comprises the bottom of the nesting post. It is advantageous for the bottom surface of said overhang to be below the lowest surface on the nesting post. If it were above such level, then it would be necessitated that the height of the complementary wall of the compatible dolly be so high that said dolly would be cumbersome for use in moving and could not be economically stacked atop one another (as illustrated in FIG. 7B). All points on the downwardly facing surfaces (not shown) that comprise the bottoms of the other overhangs of the box of the preferred embodiment are at a height, level or location which is below the height, level or location of surface 78.

Description of a Second Embodiment of the Box

Figure 1C:
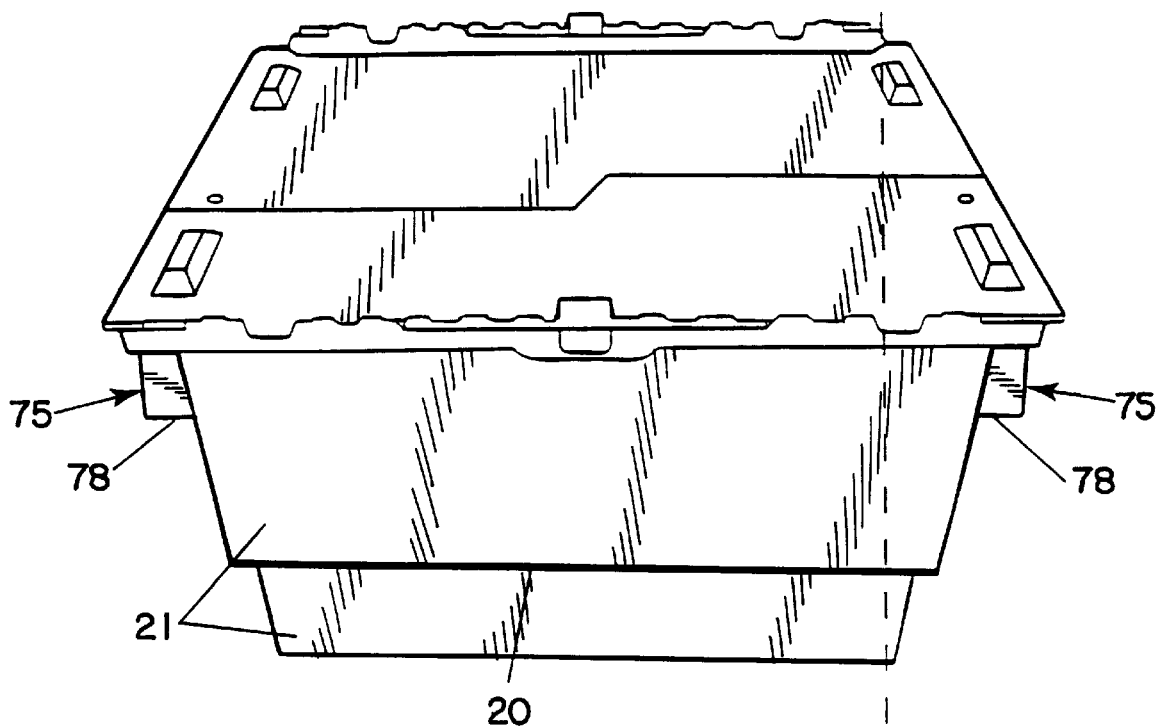
FIG. 1C is a perspective view of a second embodiment of the box of the present invention (lids closed), the composition of which is identical to FIG. 1A except that the overhang is parallel to the floor or bottom wall of the box.
Figure 1D:
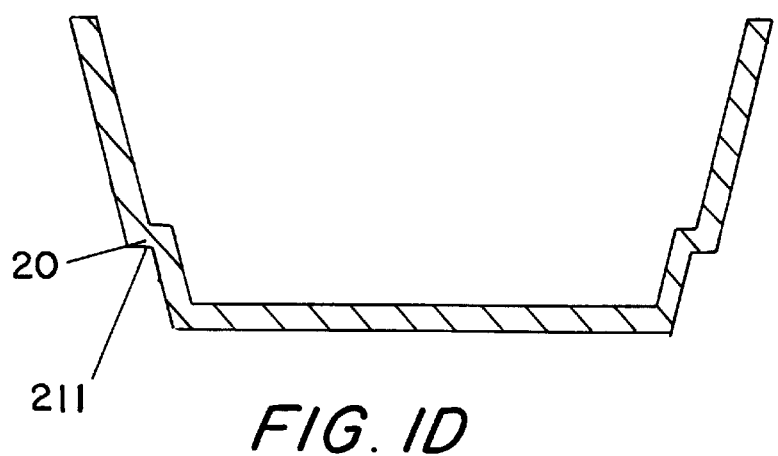
FIG. 1D is a cross sectional view taken along the lines 1D—1D of FIG. 1C.
Figure 1E:
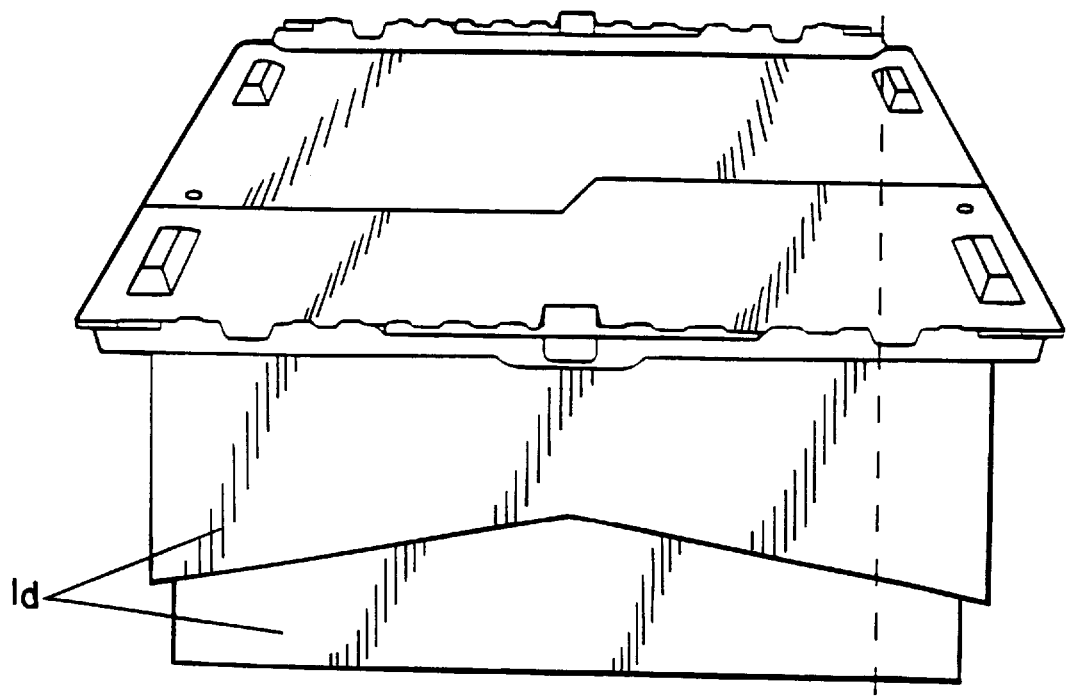
FIG. 1E is similar to FIG. 1A but with side and end walls that are perpendicular to the bottom of the box (i.e., nonoblique side and end walls) and, accordingly, the boxes do not nest inside each other.
Figure 1F:
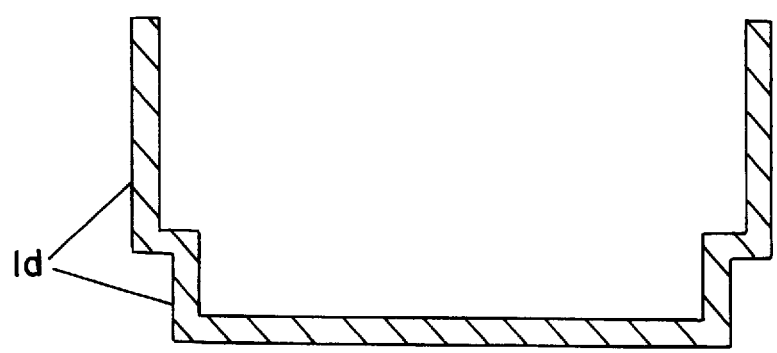
FIG. 1F is a cross sectional view taken along the lines 1F—1F of FIG. 1E.

A second embodiment of the box of the present invention is shown in FIG. 1C, which is of similar construction to the box of FIG. 1A except that the overhangs which span the side and end walls have a configuration which is substantially different in geometry from those of FIG. 1A. Overhang 20 (and the overhang on the wall opposite—not shown) begins at the left side of side wall 21 and extends horizontally in a straight line until it reaches the right side of the wall. The structure of overhang 20 includes surface 211 (FIG. 1D), which is a downwardly facing surface at the bottom of said overhang. Surface 211 is parallel to the floor of the box (such floor is not shown). The end walls (not shown) extending transverse and adjacent to side wall 21 conform to the same concepts as those discussed above for end walls. FIG. 1D shows a cross section of the box taken along the lines 1D—1D of FIG. 1C. The cross sectional view shows the depth of surface 211.

The side and end walls of the box of the second embodiment are oblique walls that are upwardly and outwardly extending from a common floor or bottom wall, as are the side and end walls in one variation of the box of the preferred embodiment, as described above. Accordingly, such boxes of the second embodiment are capable of being nested inside each other and the walls of such boxes have projecting nesting posts 75, which are identical to the nesting posts on the boxes of the preferred embodiment. All points on surface 211 (FIG. 1D) (said surface being a downwardly facing surface that comprises the bottom of overhang 20 of FIG. 1C) are at a height or level which is below the level of surface 78, said surface 78 being the downwardly facing surface that comprises the bottom of the nesting post. All points on the downwardly facing surfaces that comprise the bottoms of the other overhangs (not shown) of the box of the second embodiment are at a height or level which is below the level of surface 78. For the same reason as described above, it is advantageous for the bottom surfaces of the overhangs to be below the lowest surfaces of the nesting posts. The configuration illustrated by FIGS. 1C and 1D is described in claim 1 and may also be described in other claims.

Preferred Embodiment of the Dolly

Figure 2A:
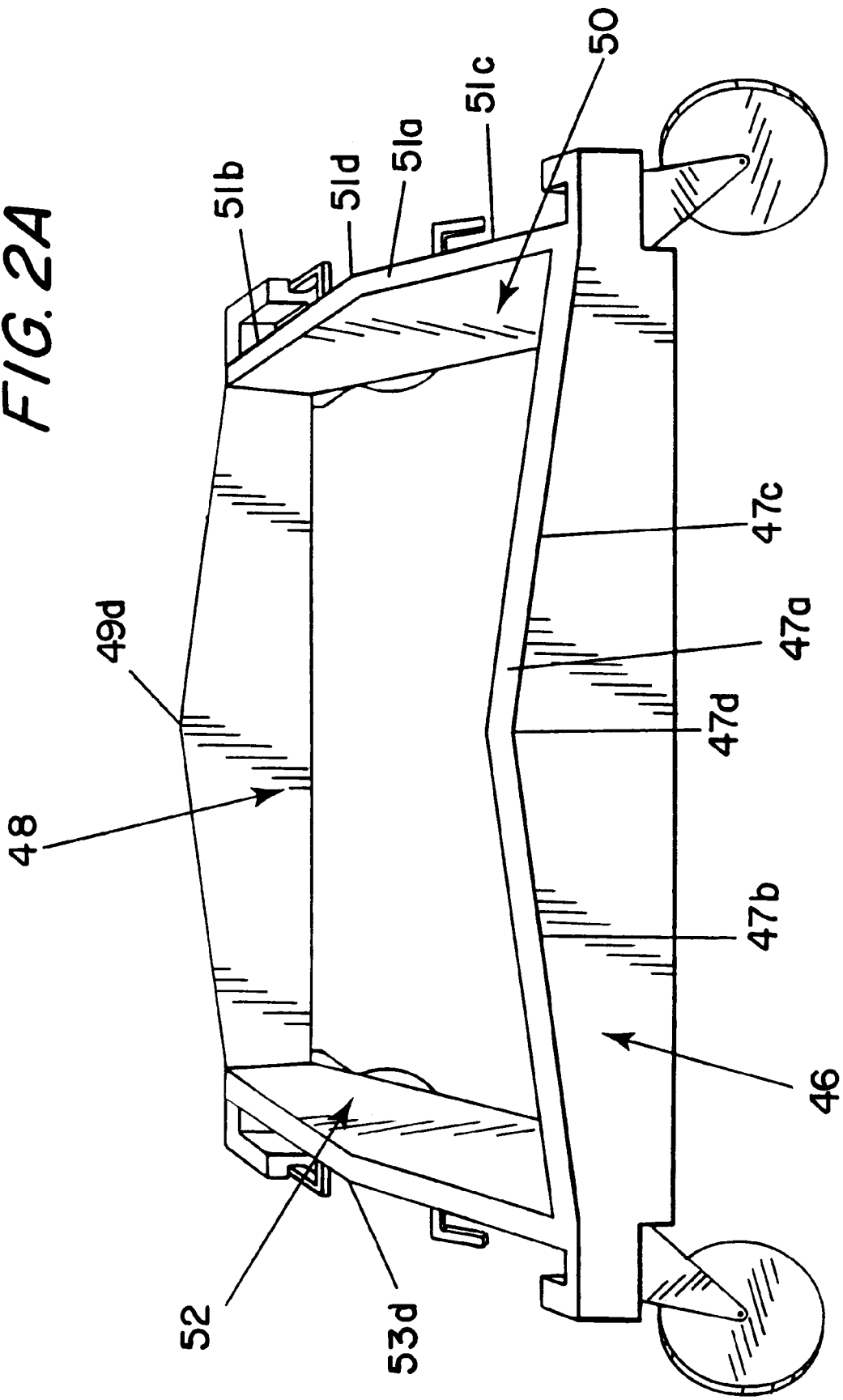
FIG. 2A is a perspective view of the preferred embodiment of the dolly of the present invention with side and end walls that support the box of FIG. 1A in accordance with the present invention.

A preferred embodiment of the dolly of the present invention is illustrated in perspective in FIG. 2A (top/front view). The dolly is substantially rectangular in configuration and has four upstanding walls which are molded or joined together at their intersecting ends to form a single integral unit without any floor or bottom support. Stated otherwise, the dolly of the present invention does not have a conventional horizontal platform, but rather is designed to support the box of the present invention along the top surfaces of its vertically oriented side and end walls. Side wall 46 of the dolly is vertically oriented or, otherwise stated, substantially upright in orientation, but may be somewhat obliqe in order to provide a more compatible fit with the vertically oriented walls of the box, if said walls of the box are also somewhat oblique.

Surface 47a is an upwardly facing surface that forms the top surface of (or is located substantially at the top of) side wall 46 and is comprised of legs 47b and 47c. In the embodiment shown, legs 47b and 47c meet on the vertical axis of side wall 46 at apex 47d. Upwardly facing surface 47a of the dolly, which is of the same shape and dimension as overhang 4a (FIG. 1A) of the box, supports the box along downwardly facing surface 4g (FIG. 1B) of said box. Side wall 46 of the dolly is referred to as a "support wall" in that its structure includes an upwardly facing top surface (surface 47a of FIG. 2A) which supports a downwardly facing bottom surface of the box (surface 4g of FIG. 1B).

FIG. 2A also shows the interior surface of side wall 48, which is opposite side wall 46. The structure and dimensions of side wall 48 are identical to those of side wall 46. Side walls 48 and 46 comprise the two long walls of the dolly.

Surface 51a is an upwardly facing surface that forms the top surface of (or is located substantially at the top of) end wall 50 and is comprised of legs 51b and 51c. In the embodiment shown, legs 51b and 51c meet on the vertical axis of end wall 50 at apex 51d. Upwardly facing surface 51a of the dolly, which is of the same shape and dimension as overhang 73a (FIG. 4A) of the box, complementarily supports the box along the downwardly facing surface (not shown) that comprises the bottom of overhang 73a.

End wall 52 is shown in FIG. 2A opposite end wall 50. The structure and dimensions of end wall 52 are identical to those of end wall 50. End walls 52 and 50 comprise the two short walls of the dolly. In the illustration shown, apexes 47d and 49d (which are of equal height) are higher than apexes 51d and 53d (which are of equal height), although in other embodiments of our invention all of such apexes may be of equal height or of unequal height.

Preferably, at least two of the four walls of the dolly are support walls. However, in other embodiments only one of the walls of the dolly may be a support wall. In that case, the dolly would presumably provide additional support to the box, such additional support being provided by a surface other than an upwardly facing top surface of a support wall Description of a Second Embodiment of the Dolly A second embodiment of the dolly of the present invention is shown in FIG. 2B (top/front view), which is of similar construction to the dolly of FIG. 2A except that the top surfaces of the walls have a configuration which is substantially different in geometry from those of FIG. 2A. In this embodiment, the dolly is also rectangular in configuration with four upstanding walls without a floor or bottom support. Side wall 62 of the dolly is vertically oriented (i.e., substantially upright in orientation), but somewhat obliqe in order to provide a more compatible fit with the relevant oblique wall of the box. Surface 63 is an upwardly facing surface that forms the top surface of side wall 62. Upwardly facing surface 63, which is of the same shape and dimension as downwardly facing surface 211 of the box (FIG. 1D), complementarily supports surface 211.

FIG. 2B also shows the interior surface of side wall 64, which is opposite side wall 62. The structure and dimensions of side wall 64 are identical to those of side wall 62. Side walls 62 and 64 comprise the two long walls of the dolly. End walls 66 and 68 of the dolly lie adjacent to side walls 62 and 64. The structure and concepts relevant to the end walls of the dolly are identical to those of the side walls, but the end walls are of shorter length.

Side wall 62 of the dolly is referred to as a "support wall" in that its structure includes an upwardly facing surface that forms the top of the wall (surface 63 of FIG. 2B), which upwardly facing surface supports a downwardly facing bottom surface of the box (surface 211 of FIG. 1D). The structure of said support wall of the dolly includes an outwardly facing surface 347 (FIG. 2B) that forms the exterior of said wall, and an inwardly facing surface (the mirror image of which is shown as surface 348 of wall 64) that forms the interior of said wall. Upwardly facing surface 63 is located between exterior surface 347 and the interior surface of wall 62 (the mirror image of which is shown as surface 348 of wall 64). Upwardly facing surface 63 is an integral element of the support wall of the dolly, i.e, such surface is a necessary component of the support wall as it would not be possible to have a vertically oriented wall that did not include such an upwardly facing surface (as well as an exterior surface and an interior surface). In the embodiment shown, side wall 62 of the dolly is an "individually distinct" support wall in that the upwardly facing surface (63), which is adapted to be in complementary engagement with the downwardly facing bottom surface of the upper member of the box (surface 211 of FIG. 1D), is an integral element of the wall.

It is important to note that the dolly of the second embodiment does not have any horizontal platform upon which objects can be supported. Generally, the only object that could be supported by the dolly is the compatibly designed box of the second embodiment, and therefore, the dolly of the second embodiment is relatively unappealing as a target of theft. This distinguishes the dolly of the second embodiment from traditional dollies and carts which have horizontal platforms across their tops, making them useful in moving a large variety of objects and therefore, appealing as targets of theft. The dolly of the second embodiment is further distinguished from traditional platform dollies in that the horizontal platforms of such dollies are not an integral element of a vertically oriented side wall.

Dolly Stacking

Figure 7A:
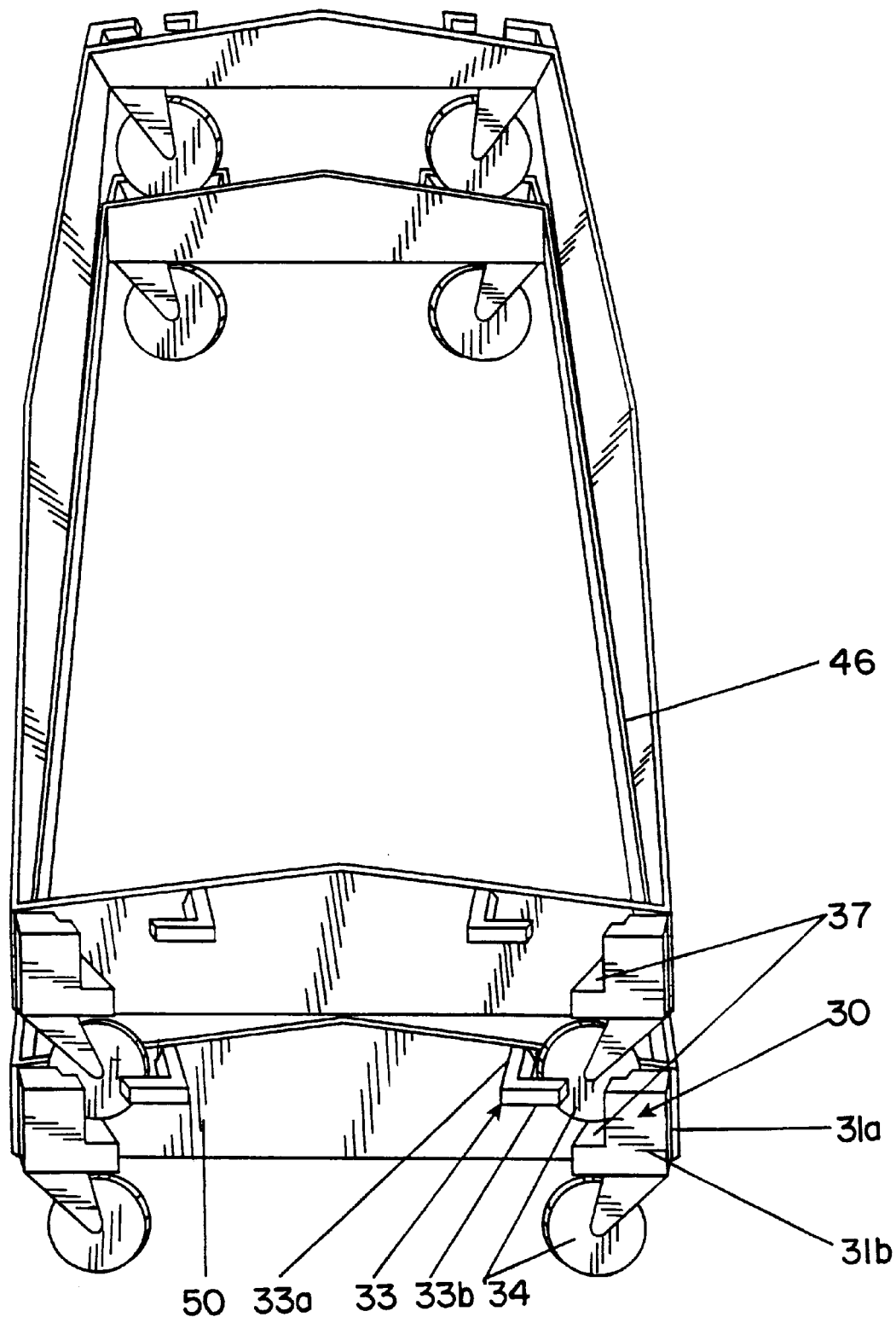
FIG. 7A shows a parallel stack of two dollies in accordance with the present invention.
Figure 7B:
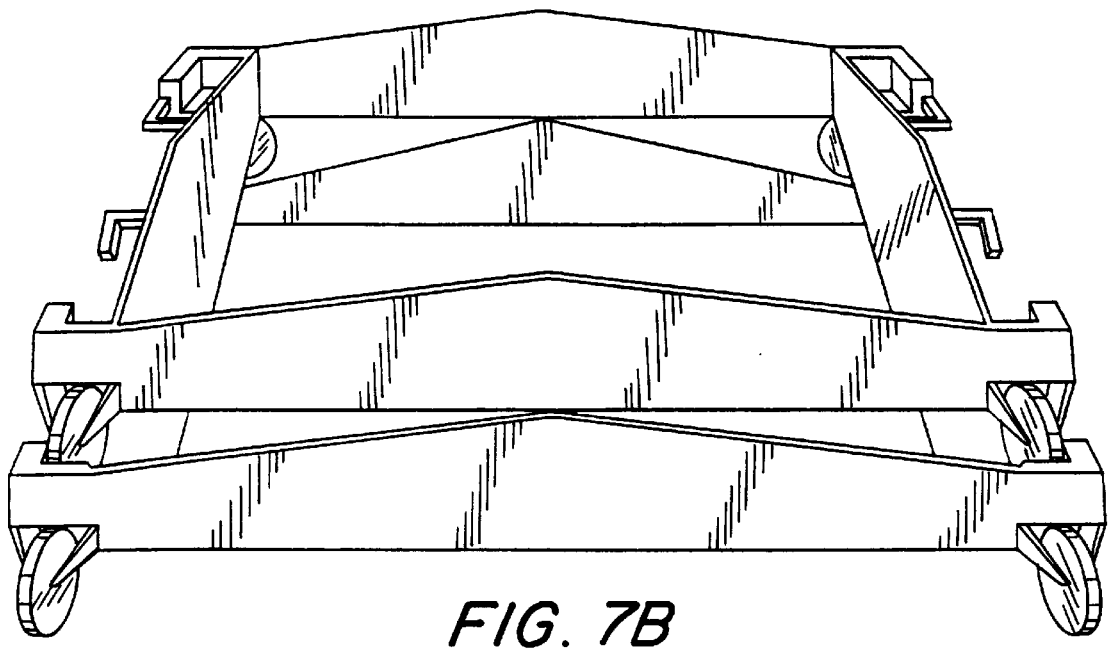
FIG. 7B is identical to FIG. 7A with a different orientation.
Figure 7C:
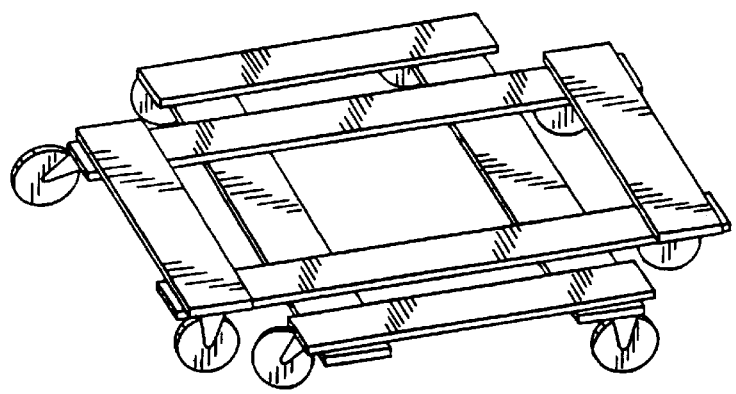
FIG. 7C shows a prior art cross stack of two conventional platform dollies.

FIGS. 7A and 7B illustrate how two dollies of the present invention are parallel stacked atop each other as compared to the cross stacking of two conventional dollies illustrated in FIG. 7C. Wheel housing 30 extends outwardly from the exterior side of end wall 50. Surface 31a comprises the outer side of the wheel housing and surface 31b comprises the front side. The wheel housing is open at its top and closed at its bottom. Floor 37 (numbered on both the upper and lower dollies for purposes of clarity) is a horizontal platform that forms the bottom of the wheel housing. Wheel 34 (numbered on both upper and lower dollies for purposes of clarity) is attached to the lower side of such surface.

Projection 33 is a wheel retainer comprised of elements 33a and 33b. Element 33a projects from wall 50 of the dolly and is perpendicular or nearly perpendicular to it. Element 33b is attached at its end to the end of element 33a and is perpendicular or nearly perpendicular to it.

As further illustrated in FIG. 7A, wheel 34 of the upper dolly sits inside wheel housing 30 of the lower dolly. In the embodiment shown, wheel 34 is oriented so that its broad side is more or less parallel to wall 50 of the lower dolly, although it may not be parallel in other embodiments. The bottom of wheel 34 rests on floor 37 of wheel rest platform 30, i.e., floor 37 supports wheels 34. The interior side of surface 31a is an abutment that prevents wheel 34 from turning and the interior side of surface 31b is an abutment that prevents it from swiveling. Further security against turning is provided by wheel retainer element 33a and further security against swiveling is provided by wheel retainer element 33b. The interior sides of both of such elements act as abutments. Wheel rest platform 30 and wheel retainer 33, along with surfaces 31a and 31b, form a pocket that is open at its top and provides clearance for insertion of the wheel of another dolly of identical construction. The pocket functions to confine the inserted wheel and limit its movement, so that dollies can be stacked upon one another with all dollies in the same orientation. The dolly contains three other housings, all of which are identical to wheel housing 30.

Operation

Figure 6A:
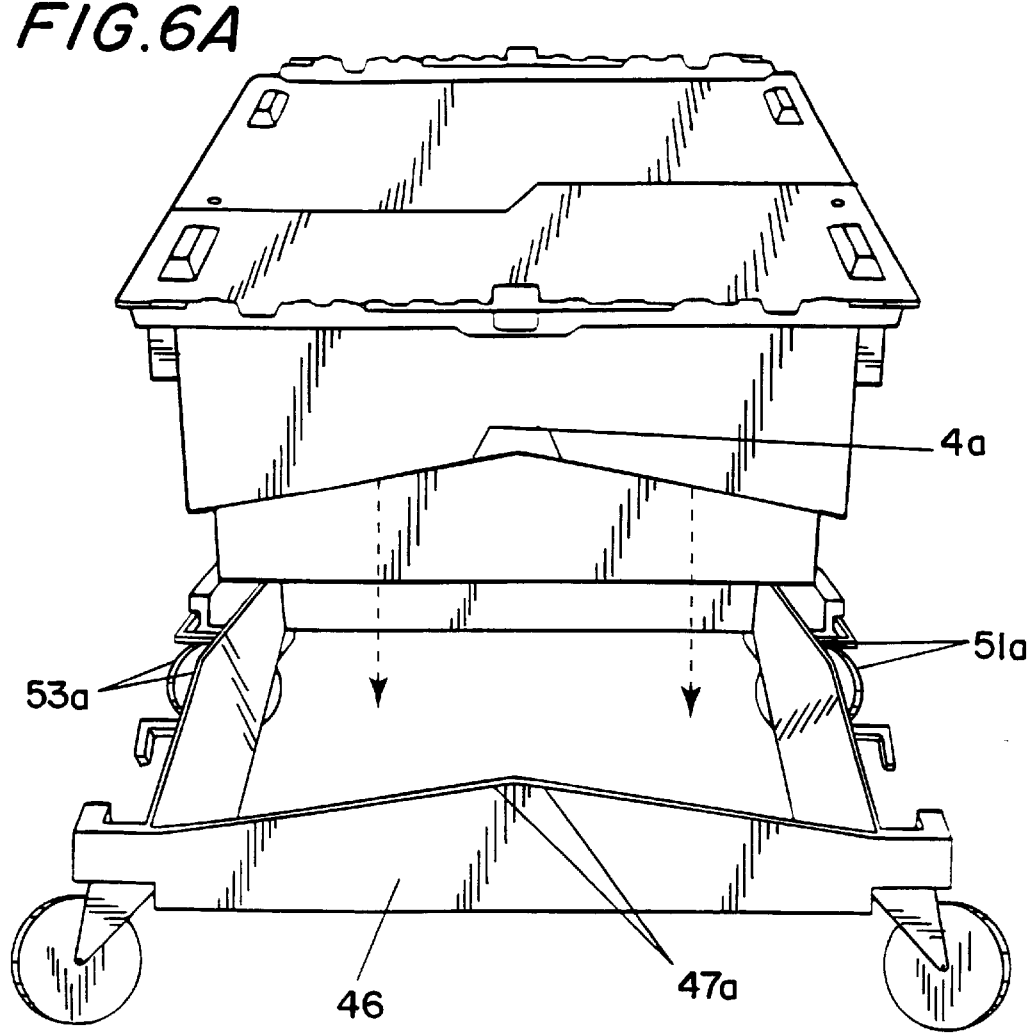
FIG. 6A shows in combination, the dolly of FIG. 2A and the box of FIG. 1A with the box descending into the dolly.
Figure 6B:
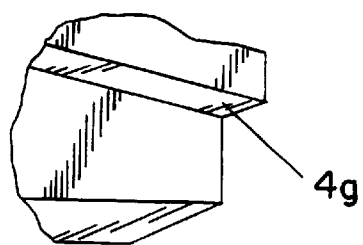
FIG. 6B is a detailed view of the downwardly facing bottom surface of the overhang shown in FIG. 6A.
Figure 6C:
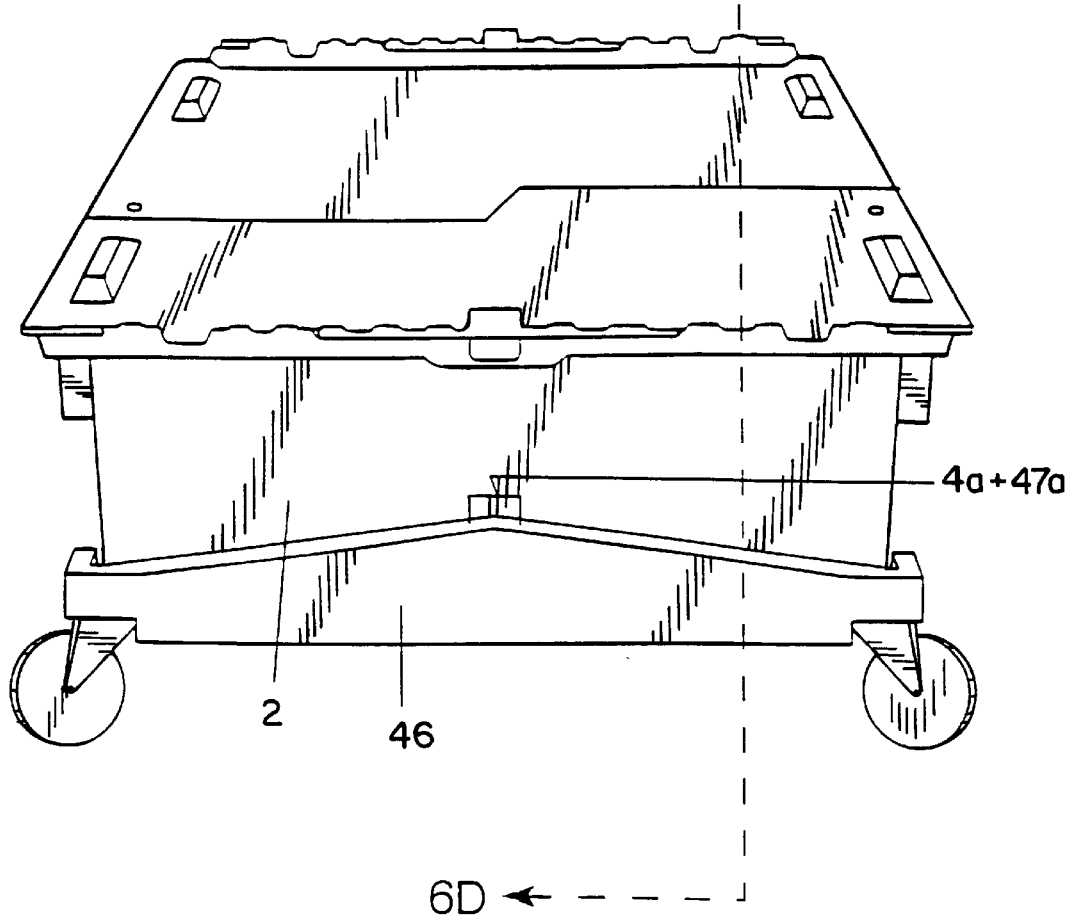
FIG. 6C shows the dolly of the present invention having one box stacked on it.
Figure 6D:
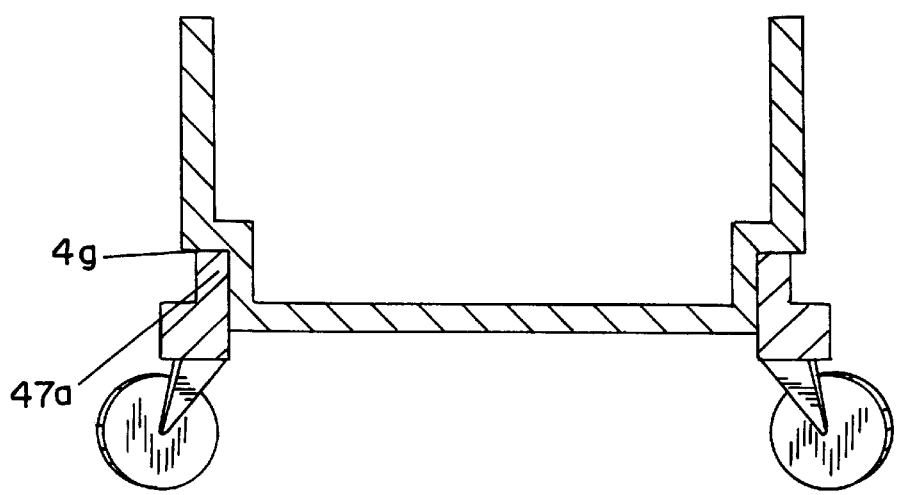
FIG. 6D is a cross sectional view taken along the lines 6D—6D of FIG. 6C.

An illustration of the manner of using the present invention for moving goods from one location to another begins with FIG. 6A, which shows the box and dolly in their preferred embodiments. The box is lowered into the dolly until upwardly facing surface 47a of the dolly meets the downwardly facing surface that comprises the bottom of overhang 4a of the box (such downwardly facing surface is shown as element 4g in FIGS. 1B and 6B); and upwardly facing surface 51a of the dolly meets the downwardly facing surface that comprises the bottom of overhang 73b of the box (overhang 73b is shown in FIG. 4A, but the downwardly facing surface which comprises its bottom is not shown). At this point, the upwardly facing surfaces on the tops of the other two walls of the dolly will meet their complementary downwardly facing surfaces on the other two walls of the box. As shown in FIGS. 6C and 6D, the upwardly facing surfaces that comprise the tops of the walls of the dolly compatibly support the corresponding downwardly facing surfaces that comprise the bottoms of the overhangs of the box. Said downwardly facing surfaces of the box are of sufficient depth for the box to rest firmly atop the dolly without falling through it. The cross sectional view in FIG. 6D shows the depth of the overhang formed by surface 4g of the box as it rests on the corresponding surface 47a of the dolly.

The dolly supports the box along the upwardly facing top surface of said dolly's side walls. The side walls, and only the side walls, of the dolly support the box. Unique to the dolly of the present invention is that it does not have any horizontal platform upon which the bottom of the box can rest. Heretofore, dolly designs have relied upon horizontal platforms as the means of supporting the objects which rest upon them. The dolly of the present invention is, in effect, a bottomless dolly.

Lacking a bottom, the dolly of the present invention will not support any object other than one which is compatibly designed to fit the the top surfaces of its side walls, such as the box of the present invention. Since virtually all other boxes and objects are not compatibly designed, they would not be supported by the dolly. Instead, they would fall off of it. This greatly limits the dolly's utility rendering it unattractive as a target of theft. This enables the dolly of the present invention to be utilized in those aspects of moving where conventional dollies with horizontal platforms would likely be stolen in significant quantities.

If a board or other flat surface were laid across the tops of the walls of the dolly of the second embodiment (shown in FIG. 2B), the dolly could be adapted to move objects other than the box of the present invention, thereby increasing the broadness of utility of the dolly and its appeal as a target of theft. The dolly of the preferred embodiment (shown in FIG. 2A) is significantly more resistant to theft and/or adaptation than the dolly of the second embodiment (shown in FIG. 2B).

In FIG. 2A, apexes 47d and 49d are higher than apexes 51d and 53d. A board or other flat surface which spanned the length and width of the dolly would come to rest upon apexes 47d and 49d, but not upon apexes 51d and 53d. For an object to be even minimally balanced, it must be supported by al] four apexes. Since the spanning object would be supported by only two apexes, it would tilt and would likely fall off the dolly or, if it did not fall, would rest in a most awkward position. For this reason, the dolly of the preferred embodiment is less appealing as a target of theft than the dolly of the second embodiment.

Other Embodiments Of The Present Invention

Figure 3A:
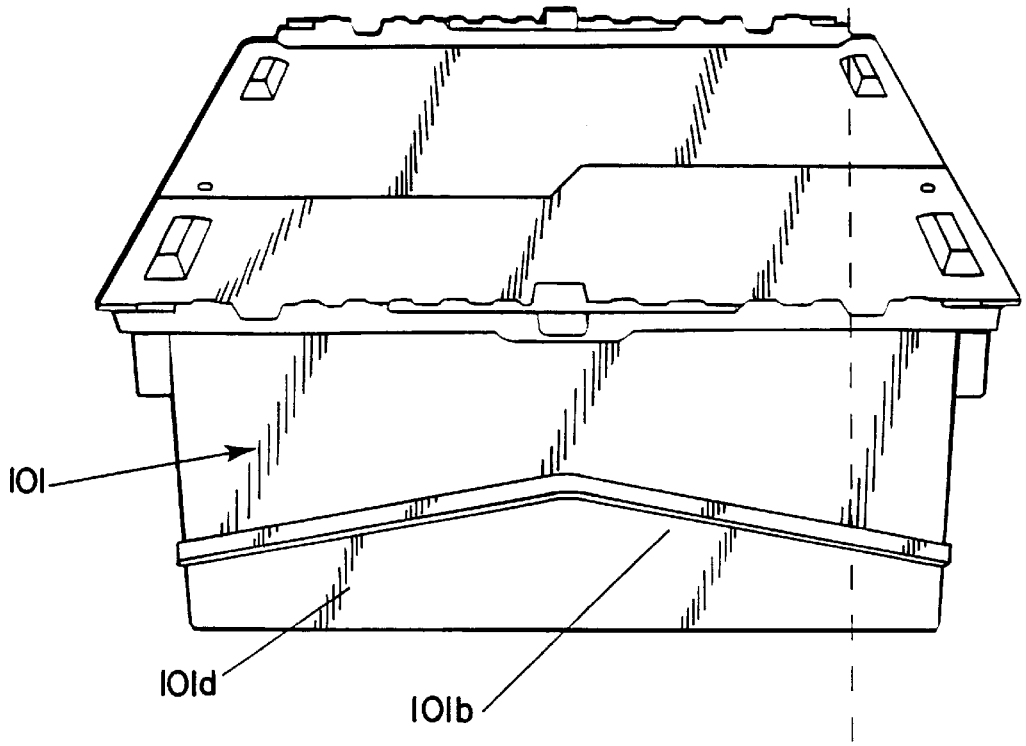
FIG. 3A is the same as FIG. 1A, but with an overhang that is formed on the side and end walls of the box (although the end walls are not shown) by a different configuration of upper and lower members than in FIG. 1A (such differences are more fully explained later in this specification)
Figure 3B:
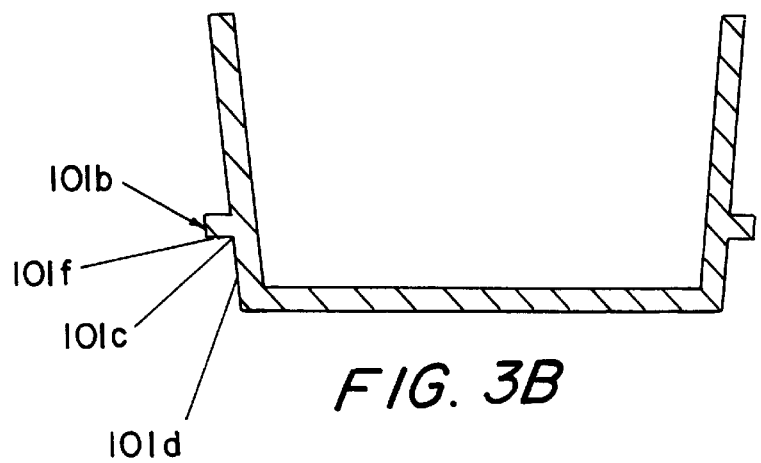
FIG. 3B shows a cross sectional view taken along the lines 3B—3B of FIG. 3A.

The claims herein refer to the concept of "upper members and lower members" of a side wall meeting along a common juncture or common edge to form an overhang. FIGS. 1A and 1B illustrate the concept that reference to "upper members of a side wall" includes members that are an integral element of such side wall, as is the case for upper member 2 shown in FIGS. 1A and 1B. FIGS. 3A and 3B illustrate the concept that reference to "upper members of a side wall" also includes members that are a distinct attachment to (or projection from) such side wall but are not an integral element of it, as is the case for upper member 101b shown in FIGS. 3A and 3B. In FIGS. 1A and 1B upper member 2 is both an integral element of side wall 1a (i.e., it is a necessary element of the upwardly extending surface of such side wall) and forms the upper component of the overhang. In FIGS. 3A and 3B, upper member 101b is a distinct ledge that is attached to (or projects from) sidewall 101. Upper member 101b is not an integral element of side wall 101 per se (i.e., side wall 101 could still function as a side wall without upper member 101b), but it is comprised within side wall 101 as a distinct ledge, shelf or lip attached to it. As such, it is comprised as an upper member of side wall 101 that is exterior to and above lower member 101d (which comprises the bottom portion of side wall 101). Upper member 101b meets lower member 101d along juncture 101c (FIG. 3B) to form an overhang that extends along said wall of the box and which overhang includes downwardly facing surface 101f at its bottom. Accordingly, upper member 101*b* is included within the language of the claims as a member that is comprised within side wall 101 but is not an integral element of it.

The current invention is not limited to the configurations of overhangs (or the downwardly facing surfaces at the bottom of such overhangs) illustrated or described in this specification. There is an infinite number of configurations that would be included within the scope of the current invention. Rather, the scope of included configurations should be determined by the language of the claims. FIGS. 5A, 5B, 5C, 5D, 5E and 5F illustrate some alternative configurations in order to exemplify, without limitation, the intended scope of such language.

Figure 5A:
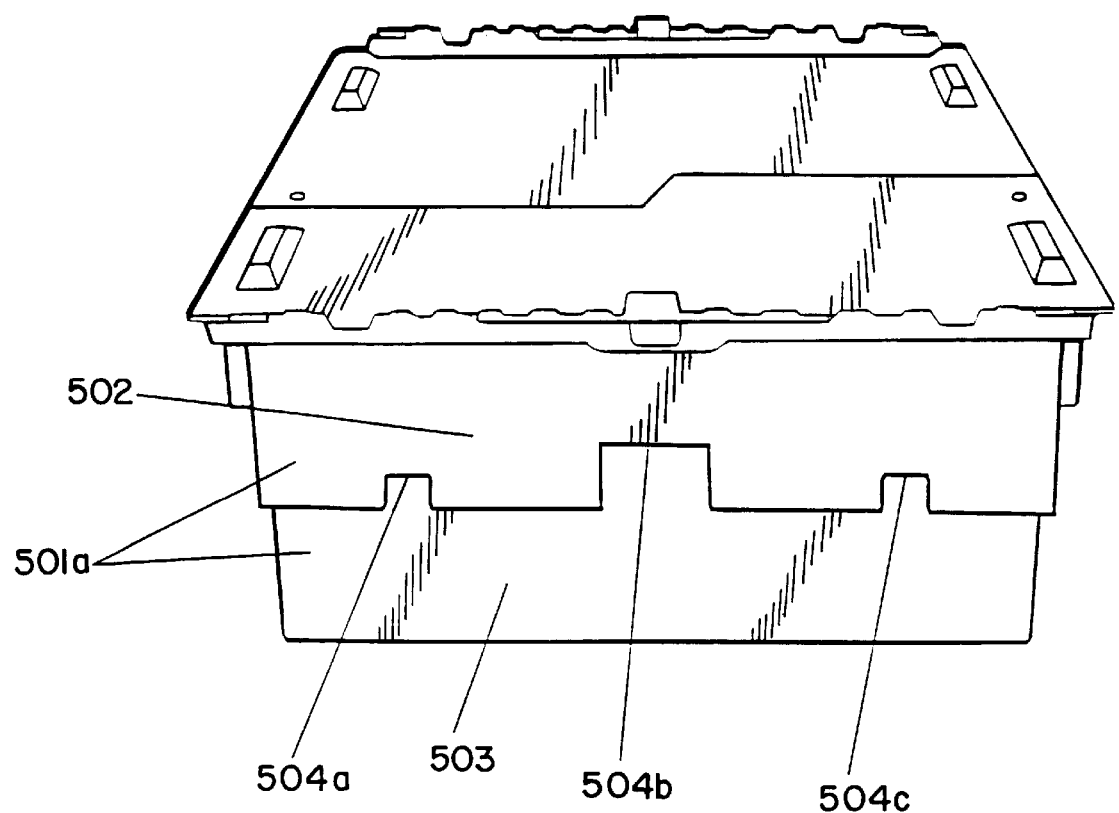

FIG. 5A illustrates the same concept as FIG. 1A, but using an overhang of a sawtooth configuration. Side wall 501*a* of FIG. 5A is comprised of upper member 502 and lower member 503, upper member 502 being above and exterior to lower member 503. The relative location of upper member 502 can be variously described in the same ways that upper member 2 is described above for FIG. 1A. Upper member 502 and lower member 503 meet along a plurality or series of junctures (which are not shown, but are constructively analagous to edge 8 of FIG. 1B) to form a plurality or series of overhangs 504*a*, 504*b* and 504*c*, which plurality or series of overhangs extend along the wall of the box in a sawtooth configuration. The structure of each overhang includes a downwardly facing surface at the bottom of said overhang (which surface is not shown, but is constructively analagous to surface 4*g* of FIG. 1B), said surfaces being at a plurality of different heights with respect to each other (i.e., such surfaces are at more than one height or are at least two different heights). Said downwardly facing surfaces are of sufficient length and width to be engaged and supported by the complementary upwardly facing surface of a compatibly designed dolly. The configuration illustrated by FIG. 5A is described in claim 6 and may also be described in other claims.

Figure 5B:
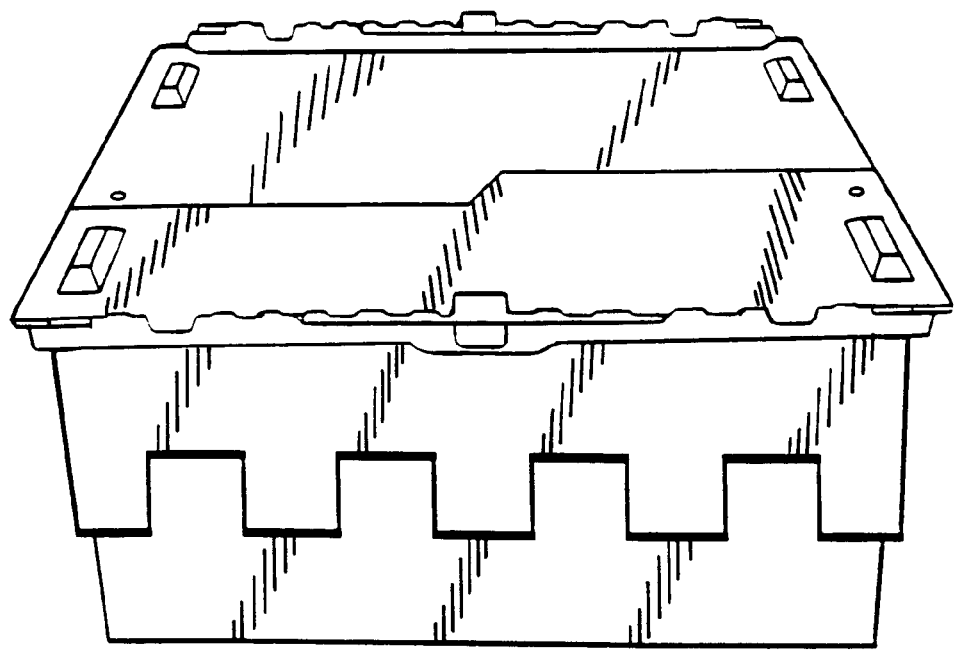

FIG. 5B illustrates the same configuration as FIG. 5A except that the downwardly facing bottom surfaces are not at a plurality of different heights with respect to each other (i.e., such surfaces are at the same height as each other). The configuration illustrated by FIG. 5B is described in claim 5 and may also be described in other claims.

Figure 5C:
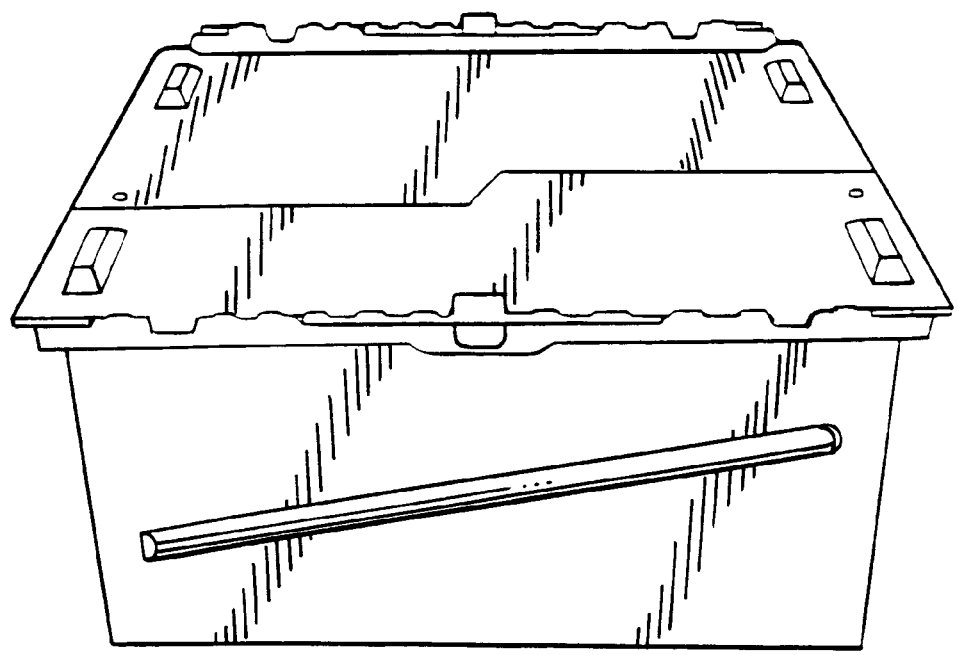

FIG. 5C illustrates a concept that is similar to FIG. 1A in that the overhang (and the downwardly facing surface at the bottom thereof) is nonparallel to the common floor of the box. However, the overhang in FIG. 5C is comprised of a singular line segment rather than two line segments which meet at an apex (as is the case in FIG. 1A). The configuration illustrated by FIG. 5B is described in claim 3 and may also be described in other claims. FIG. 5C exemplifies the concept that it is not necessary for the overhang to comprise two lines that meet at an apex for the configuration to included within the scope of claim 3. Also, the overhang illustrated in FIG. 5C does not extend all the way across the wall of the box.

FIG. 5D illustrates an overhang that is essentially of a "wavy" configuration. The overall configuration of the overhang is parallel to the bottom of the box. However, the elements of the overhang (and the downwardly facing surface at the bottom thereof) have linear segments each of which comprises a locus of points that lie nonparallel to the floor of the box. For example, the linear segment that connects points 819 and 820 is nonparallel to the bottom of the box. Accordingly, the configuration illustrated by FIG. 5D is described in claim 3 and may also be described in other claims.

Figure 5E:
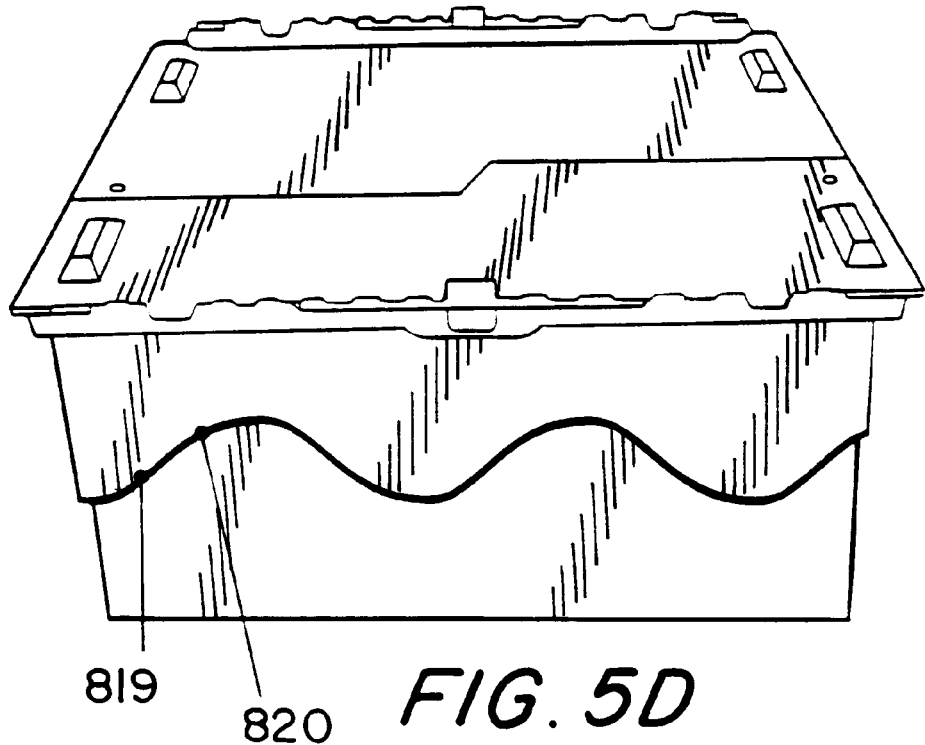
Figure 5E:
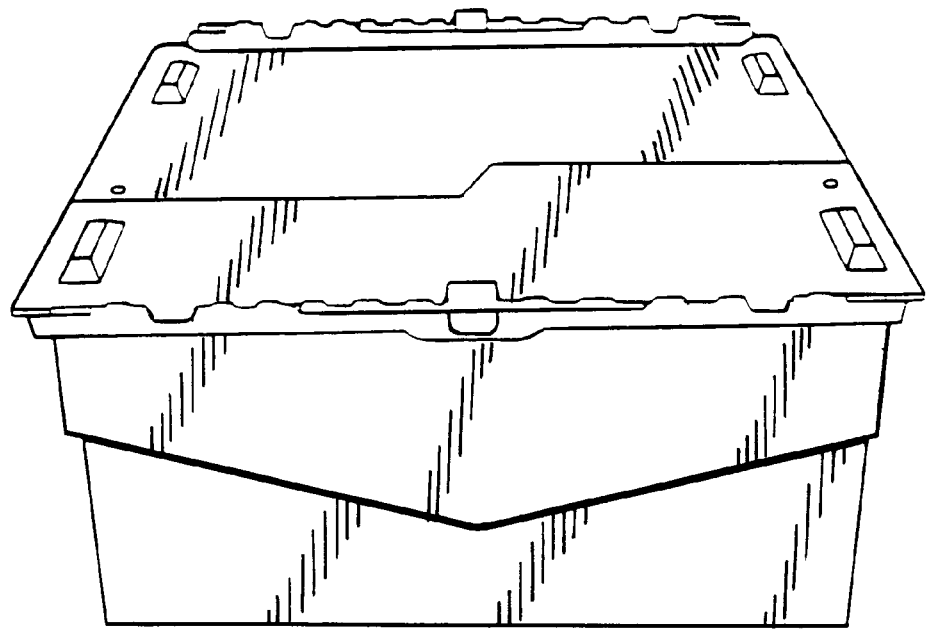

FIG. 5E illustrates an overhang that is essentially of a "V-shaped" configuration. The overall configuration of the overhang (and the downwardly facing surface at the bottom thereof) includes linear segments each of which comprises a locus of points that lie nonparallel to the floor of the box. Accordingly, the configuration illustrated by FIG. 5D is described in claim 3 and may also be described in other claims.

FIG. 5F illustrates the dolly that would mate with a box that has an overhang on each of its two opposed side walls, wherein each of said overhangs lies parallel to the floor of the box but would be at different heights with respect to each other (i.e., such overhangs would be at a plurality of different heights). In illustration 5F, surfaces 517 and 521 comprise the upwardly facing top surfaces of the two side walls of the dolly. Since surfaces 517 and 521 are at a plurality of different heights (i.e, surface 517 is higher than surface 521), a board or other object (other than the box of the present invention) sitting atop the dolly would not be evenly balanced and would easily fall off of it. The compatible downwardly facing surfaces on the box of the present invention would be parallel to the floor of said box, but would also be at a plurality of different heights. The concept embodied by FIG. 5F, as explained herein, is described in claim 7 and may also be described in other claims.

In summary, the box and dolly of the present invention relate integrally as a component system. The precise configuration of the overhang of a particular box (or the downwardly facing surface at the bottom thereof) is irrelevant to the concept of the present invention. An infinite number of configurations is possible. Similarly, the above description contains many specificities that should not be construed as limitations on the scope of the invention, but rather as exemplifications of possible embodiments thereof. Accordingly the invention should not be construed as limited to the embodiments shown and described realizing that the embodiments are but exemplifications of the invention with many other variations possible.

We claim:

1. A box and a wheeled dolly component system comprising: a box having a pair of opposed side walls, a pair of opposed end walls, a horizontal bottom wall, and a top opening for receiving articles to be transported, at least two of said walls having an upper planar wall portion and a lower planar wall portion, each upper planar wall portion extending outwardly beyond each lower planar wall portion and being interconnected to form an edge portion extending substantially along an entire length of each respective wall, each edge portion of at least one of said pairs of opposed side walls and end walls comprising at least one downwardly facing planar surface which forms an angle along the length of the wall of greater than zero degrees and less than ninety degrees with respect to the horizontal bottom wall of the box, and a wheeled dolly having a pair of opposed side support walls and a pair of opposed end support walls, said walls having upper edge portions extending substantially along their entire lengths, each such edge portion of at least one of said pairs of opposed side support walls and end support walls of the dolly comprising at least one upwardly facing inclined planar surface which forms an angle of greater than zero degrees and less than ninety degrees with respect to a substantially horizontal bottom surface of the wheeled dolly, wherein each upwardly facing inclined planar surface of the dolly is in mating engagement with a corresponding downwardly facing angled planar surface on the wall of the box substantially along their entire lengths when the box is being supported by the dolly.

2. A box and a wheeled dolly component system as defined in claim 1 wherein each edge portion of at least one of said pairs of opposed side walls and end walls of the box comprises at least two downwardly facing planar surfaces.

3. A box and a wheeled dolly component system as defined in claim 2 wherein each edge portion comprises a pair of downwardly facing planar surfaces which intersect with each other at said angle of greater than zero degrees and less than one hundred eighty degrees with respect to the horizontal bottom wall of the box.

4. A wheeled dolly as defined in claim 1, wherein at least one of said pair of the opposed side walls and opposed end walls of said dolly includes a pair of wheel housings which projects outwardly from an exterior side of each of the opposed walls, said wheel housing comprising a horizontal platform that forms a bottom for said housing and at least one projection that, in conjunction with said horizontal platform, forms a pocket with a top opening which provides clearance for the insertion of a wheel mounted on another dolly of identical construction when said other dolly is positioned above the subject dolly, said pocket functioning to confine the inserted wheel and limit movement of the wheel, a downwardly facing bottom side of said horizontal platform providing a surface for attaching a wheel to said dolly, wherein said wheel housings provides a set of secure locations upon which the wheels of an identical dolly positioned thereabove can be rested thereupon for permitting a plurality of wheeled dollies to be stacked upon one another with all dollies in the same orientation.

5. A wheeled dolly adapted to have a box mounted upon it, with said box having a pair of opposed side walls, a pair of opposed end walls, a horizontal bottom wall, and a top opening for receiving articles to be transported, at least two of said walls having an upper planar wall portion and a lower planar wall portion, each upper planar wall portion extending outwardly beyond each lower planar wall portion and being interconnected to form an edge portion extending substantially along an entire length of each respective wall, each edge portion of at least one of said pairs of opposed side walls and end walls comprising at least one downwardly facing planar surface which forms an angle along the length of the wall of greater than zero degrees and less than ninety degrees with respect to the horizontal bottom wall of the box; and a wheeled dolly having a pair of opposed side support walls and a pair of opposed end support walls, said walls having upper edge portions extending substantially along their entire lengths, each such edge portion of at least one of said pairs of opposed side support walls and end support walls of the dolly comprising at least one upwardly facing inclined planar surface which forms an angle of greater than zero degrees and less than ninety degrees with respect to a substantially horizontal bottom surface of the wheeled dolly, wherein each upwardly facing inclined planar surface of the dolly is in mating engagement with a corresponding downwardly facing angled planar surface on the wall of the box substantially along their entire lengths when the box is being supported by the dolly.

6. A box and a wheeled dolly component system as defined in claim 5 wherein each edge portion of at least one of said pairs of opposed side walls and end walls of the box comprises at least two downwardly facing planar surfaces.

7. A box and a wheeled dolly component system as defined in claim 6 wherein each edge portion comprises a pair of downwardly facing planar surfaces which intersect with each other at said angle of greater than zero degrees and less than one hundred eighty degrees with respect to the horizontal bottom wall of the box.

8. A wheeled dolly as defined in claim 5, wherein at least one of said pair of the opposed side walls and opposed end walls of said dolly includes a pair of wheel housings which projects outwardly from an exterior side of each of the opposed walls, said wheel housing comprising a horizontal platform that forms a bottom for said housing and at least one projection that, in conjunction with said horizontal platform, forms a pocket with a top opening which provides clearance for the insertion of a wheel mounted on another dolly of identical construction when said other dolly is positioned above the subject dolly, said pocket functioning to confine the inserted wheel and limit movement of the wheel, a downwardly facing bottom side of said horizontal platform providing a surface for attaching a wheel to said dolly, wherein said wheel housings provides a set of secure locations upon which the wheels of an identical dolly positioned thereabove can be rested thereupon for permitting a plurality of wheeled dollies to be stacked upon one another with all dollies in the same orientation.

\* \* \* \* \*